(12) United States Patent
Huang

(10) Patent No.: US 8,418,713 B2
(45) Date of Patent: Apr. 16, 2013

(54) MOBILE TIRE INFLATOR

(76) Inventor: Raymond Huang, Changhua County (TW)

(*) Notice: Subject to any disclaimer, the term of this patent is extended or adjusted under 35 U.S.C. 154(b) by 293 days.

(21) Appl. No.: 12/923,048

(22) Filed: Aug. 31, 2010

(65) Prior Publication Data

US 2011/0100480 A1   May 5, 2011

(30) Foreign Application Priority Data

Oct. 29, 2009   (TW) ................................ 98220028 U

(51) Int. Cl.
*F16K 15/20* (2006.01)
(52) U.S. Cl.
USPC .............................. 137/224; 137/227; 137/557
(58) Field of Classification Search .................. 137/223, 137/224, 226, 227, 228, 557; 152/415, 416; 73/146.2, 146.3
See application file for complete search history.

(56) References Cited

U.S. PATENT DOCUMENTS

| | | | | |
|---|---|---|---|---|
| 4,456,038 A * | 6/1984 | Gwaltney et al. | ............ | 137/224 |
| 4,583,566 A * | 4/1986 | Kalavitz et al. | ............... | 137/224 |
| 4,998,438 A * | 3/1991 | Martin | ........................ | 73/146.8 |
| 5,908,984 A * | 6/1999 | Chuang | ........................ | 73/146.3 |
| 6,034,596 A * | 3/2000 | Smith et al. | .................. | 73/146.5 |
| 6,067,850 A * | 5/2000 | Lang et al. | .................... | 152/415 |
| 6,612,165 B2 * | 9/2003 | Juzswik et al. | ............. | 73/146.2 |
| 6,838,983 B1 * | 1/2005 | Wong | ........................... | 73/146.2 |
| 6,966,220 B2 * | 11/2005 | Yueh | ............................. | 137/224 |
| 7,040,153 B2 * | 5/2006 | Kroll et al. | ...................... | 73/146 |
| 7,096,881 B1 * | 8/2006 | Fernandez | .................... | 137/557 |
| 7,889,064 B2 * | 2/2011 | Petrucelli | ..................... | 73/146.2 |
| 8,191,586 B2 * | 6/2012 | Huval et al. | .................... | 152/415 |

\* cited by examiner

*Primary Examiner* — Craig Schneider
*Assistant Examiner* — Craig J Price
(74) *Attorney, Agent, or Firm* — Bacon & Thomas, PLLC

(57) ABSTRACT

A mobile tire inflator includes a control panel, multiple air passages, an inflation valve, a discharge valve and a pressure sensor. The user can control the operation of the inflation valve and the discharge valve automatically or manually by through a control panel, and switch between the automatic mode and the manual mode during operation. Matching with the operation of the pressure sensor, the mobile tire inflator achieves accurate tire pressure inflation and discharge and has the advantages of operation flexibility and high mobility.

6 Claims, 3 Drawing Sheets

MOBILE TIRE INFLATOR

BACKGROUND OF THE INVENTION

1. Field of the Invention

The present invention relates to tire inflators and more particularly, to a mobile tire inflator.

2. Description of the Related Art

Conventionally, a tire inflator must be continuously pushed and pulled to inflate a tire to a saturated condition. This operation is inconvenient. Further, when inflating the tire, the tire pressure value is displayed at the end of air pressure source (for example, the pressure gauge of the air compressor). Thus, the user cannot know the current tire pressure of the tire and the tire may be over-inflated or under-inflated.

In view of the aforesaid drawbacks, a fixed type of automatic tire inflator was created. During the use of this fixed type of automatic tire inflator, attach the air tube of the fixed type of automatic tire inflator to the air valve of the tire and then operate the face panel of the fixed type of automatic tire inflator to input a target tire pressure. At this time, the fixed type of automatic tire inflator automatically inflates the tire till that the tire pressure of the tire reaches the set target tire pressure value, This design of fixed type of automatic tire inflator avoids over-inflation or under-inflation.

However, the aforesaid fixed type of automatic tire inflator is huge and heavy, and cannot be carried by the user. It can only be set in a fixed place (for example, gas station) for regular use, not practical to fit different needs. Further, the aforesaid fixed type of automatic tire inflator simply provides an automatic inflation mode, giving no flexibility in use. Further, tire pressure display and add/deduct functions are designed at the face panel of the fixed type of automatic tire inflator that is disposed far away from the user, making the operation inconvenient.

SUMMARY OF THE INVENTION

The present invention has been accomplished under the circumstances in view. It is the main object of the present invention to provide a mobile tire inflator, which has the advantages of operation flexibility, high mobility and ease of use.

To achieve this and other objects of the present invention, a mobile tire inflator comprises a housing, which comprises an air intake passage, an air outlet passage, an air discharge passage and a main air passage in communication with the air intake passage, the air outlet passage and the air discharge passage, the air intake passage being adapted for connecting to an external air pressure source, the air outlet passage being connectable to an air valve of the tire to be inflated/discharged, the air discharge passage being in communication between the main air passage and the atmosphere; a control panel, which is mounted in the housing and comprises a processing unit, a control unit and a display unit respectively electrically connected to one another, the processing unit comprising a switching circuit, the control unit comprising a mode-switching button and a setting button set, the mode-switching button being operable to switch the switching circuit between a manual mode and an automatic mode, the setting button set being operable to set a target tire pressure value after start of the automatic mode, the setting button set being operable to increase/decrease the current tire pressure of the tire after startup of the manual mode, the display unit being adapted to display the target tire pressure value and the current tire pressure value of the tire; an inflation valve, which is electrically connected to the processing unit and set between the air intake passage and the main air passage to control connection between the air intake passage and the main air passage; a discharge valve, which is electrically connected to the processing unit and set between the air discharge passage and the main air passage to control connection between the air discharge passage and the main air passage; and a pressure sensor, which is installed in the main air passage and electrically connected to the processing unit for measuring the current tire pressure value of the tire to be inflated. When the automatic mode is started up and the pressure sensor senses the tire pressure of the tire to be greater than a predetermined threshold value, the inflation valve/the discharge valve is automatically opened for enabling a compressed air of the air pressure source to go into/out of the tire, and automatically closed when the current tire pressure of the tire reaches the set target tire pressure value. The mode-switching button is operable to switch from the automatic mode to the manual mode during running of the automatic mode, for enabling the inflation valve/the discharge valve to be opened after the setting button set having been operated. The inflation valve/the discharge valve is openable to increase/decrease the current tire pressure of the tire after the setting button set is operated and after startup of the manual mode. The mode-switching button is operable to switch from the manual mode to the automatic mode during running of the manual mode, for enabling the inflation valve/the discharge valve to be opened automatically.

DETAILED DESCRIPTION OF THE INVENTION

Figure 1:
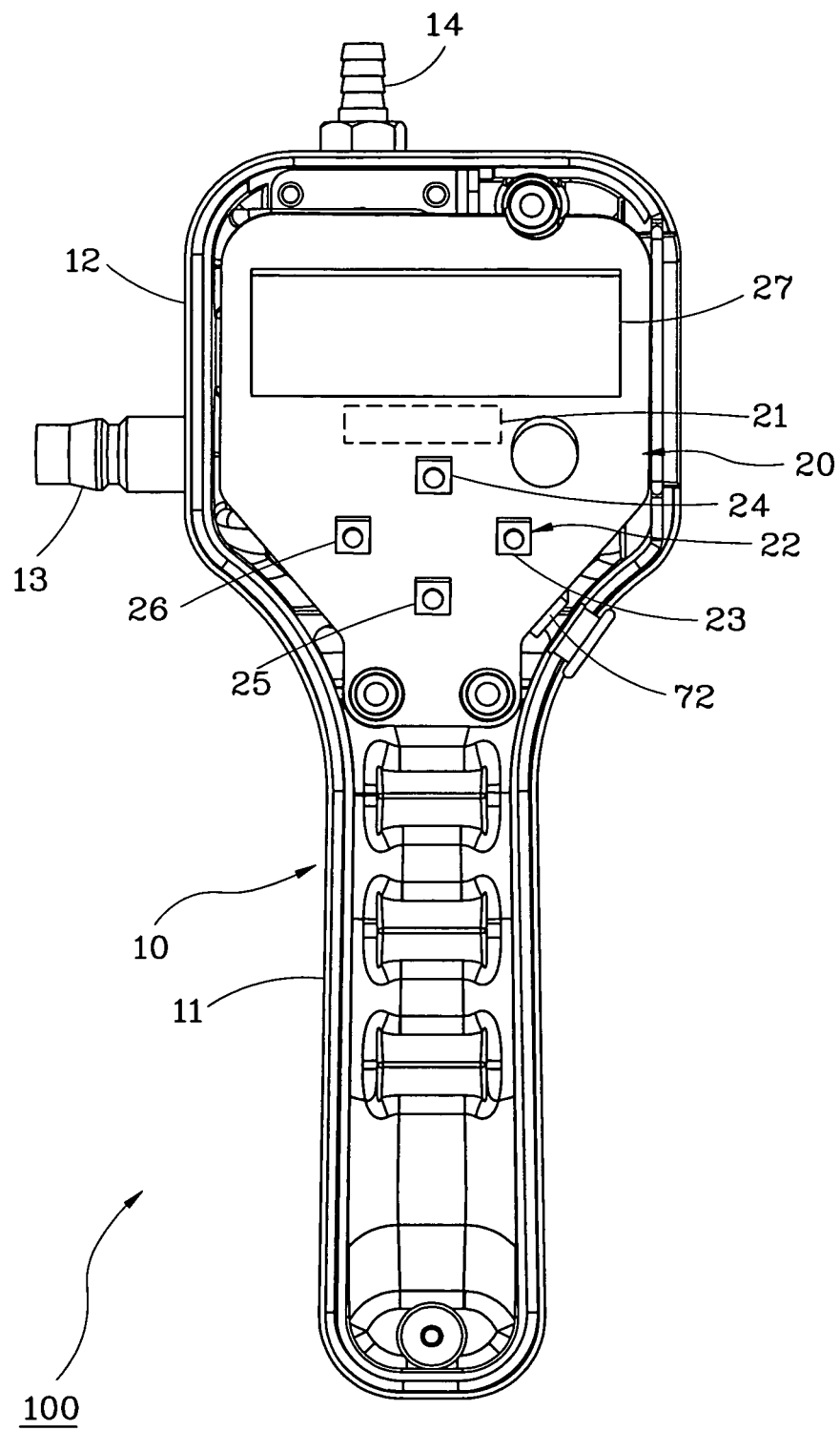
FIG. 1 is a schematic sectional view of a mobile tire inflator in accordance with the present invention, illustrating the arrangement of the control panel.
Figure 2:
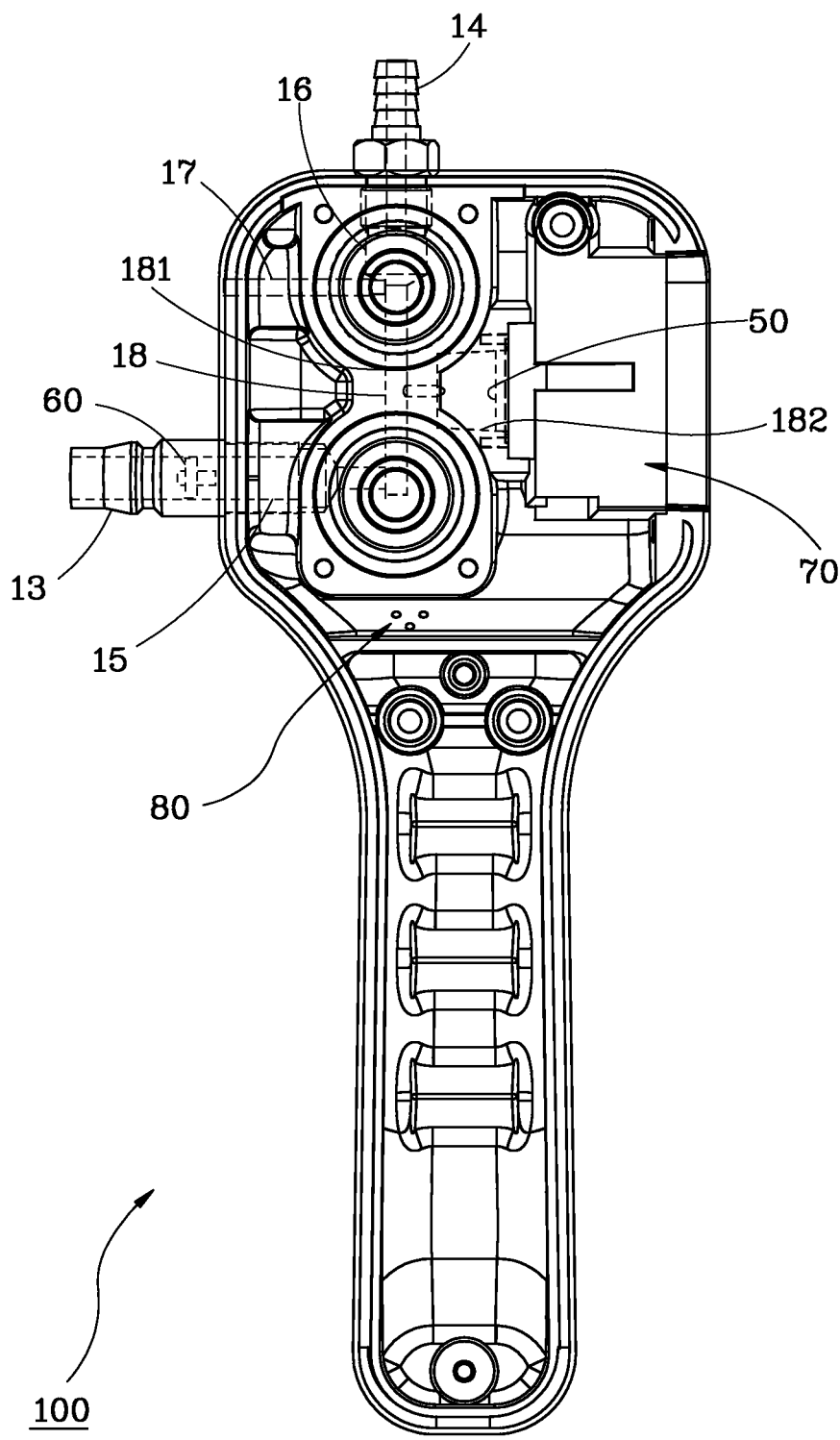
FIG. 2 illustrates the internal structure and arrangement of air passages of the mobile tire inflator shown in FIG. 1.
Figure 3:
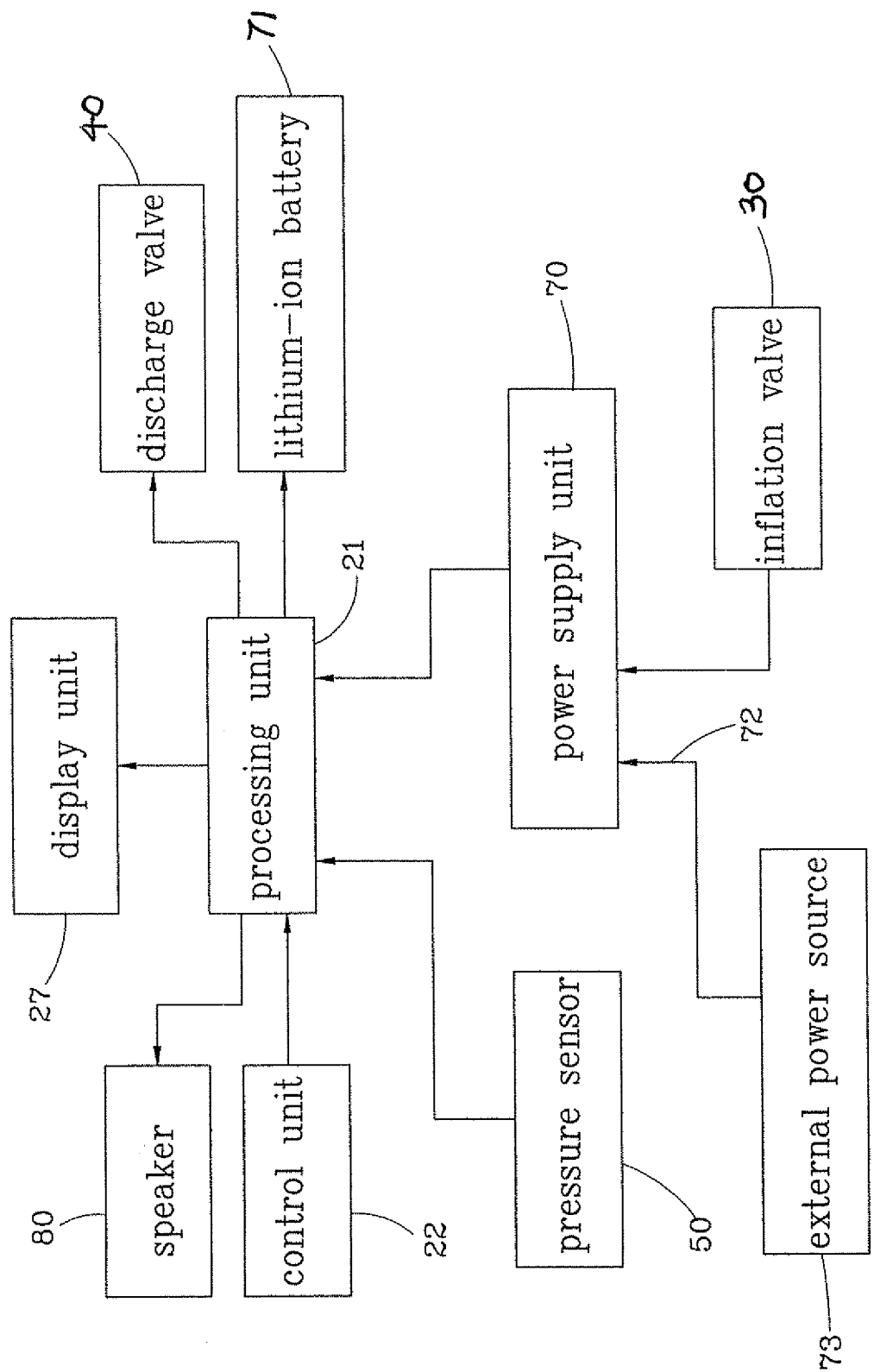
FIG. 3 is a function block diagram of the mobile tire inflator in accordance with the present invention.

Referring to FIGS. 1~3, a mobile tire inflator 100 in accordance with the present invention is shown comprising a housing 10, a control panel 20, an inflation valve 30, a discharge valve 40, a pressure sensor 50, a check valve 60, a power supply unit 70 and a speaker 80.

The housing 10 includes a handle 11 and a head 12. The handle 11 is configured for grasping thereof by a person's hand. The head 12 has an air intake pipe 13 located on the periphery for the connection of an external air pressure source (not shown; for example, air compressor), an air outlet pipe 14 located on the periphery for connecting to a tire's air valve (not shown), an air intake passage 15 and an air outlet passage 16 defined therein and respectively connected to the air intake pipe 13 and the air outlet pipe 14, an air discharge passage 17, and a main air passage 18 in communication with the air intake passage 15, the air outlet passage 16 and the air discharge passage 17. The air discharge passage 17 extends from the main air passage 18 to the outside of the housing 10. The main air passage 18 includes a horizontal segment 181 and a vertical segment 182 perpendicularly extending from one end of the horizontal segment 181.

The control panel 20 is a circuit board mounted in the head 12 of the housing 10, comprising a processing unit 21, a control unit 22 and a display unit 27 that are electrically connected to one another. The processing unit 21 has a built-in switching circuit and a threshold value (for example, 3 PSI). The control unit 22 comprises a mode-switching button 23, a setting button set including an Add (+) button 24 and a Deduct (−) button 25, and a Start button 26. Clicks the mode-switching button 23 will cause switching of the switching circuit between a manual mode and an automatic mode. When under the automatic mode, the user can press the Add (+) button 24 or the Deduct (−) button 25 to set a target tire pressure value. When under the manual mode, the user can press the Add (+) button 24 or the Deduct (−) button 25 to increase or reduce the current tire pressure. Detailed description will be explained latter. Further, the target tire pressure value and the current tire pressure value can be displayed on the display unit 27 for viewing by the user.

It is to be understood that the mode-switching button 23 is also used a tire pressure unit conversion button to convert tire pressure units (including the units of PSI, Bar, KPa and Kgf/cm$^2$); the Deduct (−) button 25 is also used for starting up the mobile tire inflator 100; the Start button 26 is also used as reset button to zero the target tire pressure value. Thus, the size of the mobile tire inflator 100 can be greatly reduced.

The inflation valve 30 is an electromagnetic valve electrically connected to the processing unit 21 and set between the air intake passage 15 and the main air passage 18 to control connection between the air intake passage 15 and the main air passage 18. As this electromagnetic valve is of the known art, no further detailed description in this regard is necessary.

The discharge valve 40 is an electromagnetic valve electrically connected to the processing unit 21 and set between the air discharge passage 17 and the main air passage 18 to control connection between the air discharge passage 17 and the main air passage 18.

The pressure sensor 50 is installed in the vertical segment 182 of the main air passage 18, and electrically connected to the processing unit 21 for measuring the current tire pressure value of the tire.

The check valve 60 is installed in the air intake passage 15, and functioning to let the mobile tire inflator 100 be used as a tire pressure gauge when the mobile tire inflator 100 is not connected to the external air pressure source.

The power supply unit 70 is electrically connected to the processing unit 21. According to the present preferred embodiment, the power supply unit 70 comprises a lithium-ion battery 71 mounted in the head 12 of the housing 10, and a charging terminal 72 electrically connectable to an external power source 73 to charge the lithium-ion battery 71.

The speaker 80 is electrically connected to the processing unit 21.

When using the mobile tire inflator 100, the user can select the automatic mode or the manual mode depending on circumstances, and can switch between the automatic mode and the manual mode during operation. If the automatic mode is selected, set the target tire pressure value at first, and then connect the chuck (not shown) of the air intake pipe 13 to the air valve of the tire to be inflated. At this time, the pressure sensor 50 senses the pressure of the tire. When the pressure of the tire surpasses a threshold (for example, 3 PSI) and is below the target tire pressure value, the speaker 80 is driven to output sound, and the inflation valve 30 is opened for enabling compressed air to be charged from the external air pressure source into the tire till that the tire pressure of the tire reaches the target tire pressure value. When the tire pressure of the tire reaches the target tire pressure value, the speaker 80 is driven to output sound again, informing the user to remove the chuck from the air valve of the tire. Thus, the inflation procedure is completed. The procedure of discharging the tire pressure of the tire is operated in the same manner with the exception that the discharge valve 40 is opened for enabling tire air to be discharged out of the tire till that the tire pressure of the tire reaches the target tire pressure value. The setting of the threshold value eliminates a false action of the inflation valve 30 or the discharge valve 40 due to a pressure difference upon startup of the mobile tire inflator 100.

Further, the user can select the manual mode, and press the Add (+) button 24 and the Deduct (−) button 25 to open/close the inflation valve 30 and the discharge valve 40, controlling inflation or discharge of compressed air to increase or reduce the current tire pressure on the real time.

Further, during running of the aforesaid manual or automatic mode, the user can switch to the other mode at anytime when necessary. For example, if the automatic mode is selected and the pressure sensor 50 senses the pressure of the tire to be greater than 3 PSI, the inflation valve/discharge valve 40 will be automatically opened for enabling compressed air to be charged into or discharged out of the tire, and the inflation valve/discharge valve 40 will be automatically closed when the tire pressure of the tire measured by the pressure sensor 50 reaches the target tire pressure value. During the operation, the user can press the mode-switching button 23 to switch from the automatic mode to the manual mode, allowing the inflation valve 30 or the discharge valve 40 to be opened only when the setting button set is operated, facilitating micro-adjustment of the tire pressure. On the contrary, if the manual mode is originally set, the inflation valve 30/discharge valve 40 will be opened to increase or reduce the tire pressure only when the setting button set is operated, facilitating micro-adjustment of the tire pressure. During running under the manual mode, the user can press the mode-switching button 23 to switch from the manual mode to the automatic mode, enabling the inflation valve 30 and the discharge valve 40 to be opened automatically, enhancing operation flexibility and convenience. For example, if much time is necessary to reach the target tire pressure value under the manual mode, the user can switch from the manual mode to the automatic mode during operation.

As stated above, the invention has a control interface and a display interface be integrated into a small handheld device, facilitating carrying and enabling the user to change the setting or to view the current inflating or discharging operation. Therefore, the invention facilitates operation. Further, tire pressure inflation or discharge operation can be performed either automatically or manually to fit different conditions, enhancing flexibility in use.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A mobile tire inflator, comprising:

a housing, said housing comprising an air intake passage, an air outlet passage, an air discharge passage and a main air passage in communication with said air intake passage, said air outlet passage and said air discharge passage, said air intake passage being adapted for connecting to an external air pressure source, said air outlet passage being connectable to a tire to be inflated/discharged, said air discharge passage being in communication between said main air passage and the atmosphere;

a control panel mounted in said housing, said control panel comprising a processing unit, a control unit and a display unit respectively electrically connected to one another, said processing unit comprising a switching circuit, said control unit comprising a mode-switching button and a setting button set, said mode-switching button being operable to switch said switching circuit between a manual mode and an automatic mode, said setting button set being operable to set a target tire pressure value after start of said automatic mode, said setting button set being operable to increase/decrease a current tire pressure of the tire after startup of said manual mode, said display unit being adapted to display said target tire pressure value and the current tire pressure value of the tire;

an inflation valve electrically connected to said processing unit and set between said air intake passage and said main air passage to control connection between said air intake passage and said main air passage;

a discharge valve electrically connected to said processing unit and set between said air discharge passage and said main air passage to control connection between said air discharge passage and said main air passage; and a pressure sensor installed in said main air passage and electrically connected to said processing unit for measuring the current tire pressure value of the tire to be inflated;

wherein when said automatic mode is started up and said pressure sensor senses the tire pressure of the tire to be greater than a predetermined threshold value, said inflation valve/said discharge valve is automatically opened for enabling a compressed air of said air pressure source to go into/out of the tire, and automatically closed when the current tire pressure of the tire reaches the set target tire pressure value; said mode-switching button is operable to switch from said automatic mode to said manual mode during running of said automatic mode, for enabling said inflation valve/said discharge valve to be opened after said setting button set is operated; said inflation valve/said discharge valve is openable to increase/decrease the current tire pressure of the tire after said setting button set is operated and after startup of said manual mode; said mode-switching button is operable to switch from said manual mode to said automatic mode during running of said manual mode, for enabling said inflation valve/said discharge valve to be opened automatically.

2. The mobile tire inflator as claimed in claim 1, wherein said main air passage comprises a horizontal segment and a vertical segment perpendicularly extending from one end of said horizontal segment; said pressure sensor is installed in said vertical segment of said main air passage.

3. The mobile tire inflator as claimed in claim 1, further comprising a check valve installed in said air intake passage.

4. The mobile tire inflator as claimed in claim 1, further comprising a power supply unit electrically connected to said processing unit, said power supply unit comprising a battery and a charging terminal electrically connectable to an external power source.

5. The mobile tire inflator as claimed in claim 1, further comprising a speaker electrically connected to said processing unit.

6. The mobile tire inflator as claimed in claim 1, wherein said housing comprises a handle configured for grasping thereof by a person's hand, and a head adapted for accommodating said control panel; said air intake passage and said air outlet passage are integrated into said head.

\* \* \* \* \*